United States Patent [19]

Shomper

[11] Patent Number: 4,895,435
[45] Date of Patent: Jan. 23, 1990

[54] APPARATUS FOR IMPROVING A DRIVER'S REARWARD FIELD OF VISION IN A MOTOR VEHICLE

[76] Inventor: George D. Shomper, 2501 Ambler Ct., Baltimore, Md. 21222

[21] Appl. No.: 285,061

[22] Filed: Dec. 16, 1988

[51] Int. Cl.$^4$ .......................... B60R 1/04; B60R 1/08; B60J 3/00; G02B 7/18
[52] U.S. Cl. .................................... 350/606; 350/633; 296/97.5
[58] Field of Search ...................... 350/606, 632, 633; 296/97.2, 97.5, 97.6

[56] References Cited

U.S. PATENT DOCUMENTS

| | | | |
|---|---|---|---|
| 2,045,751 | 6/1936 | Burlein | 296/97.5 |
| 2,123,400 | 7/1938 | Carlson | 296/97.5 |
| 3,494,689 | 2/1970 | McGlinchy | 350/606 |
| 3,533,681 | 10/1970 | Glaser | 350/606 |
| 3,679,255 | 7/1972 | Nacarato | 296/97 C |
| 4,187,001 | 2/1980 | Redwitz et al. | 350/202 |
| 4,394,065 | 7/1983 | Swanson | 350/304 |
| 4,486,819 | 12/1984 | Marcus et al. | 362/142 |

FOREIGN PATENT DOCUMENTS 3414279 10/1925 Fed. Rep. of Germany ...... 350/606

Primary Examiner—Jon W. Henry
Attorney, Agent, or Firm—Leonard Bloom

[57] ABSTRACT

An apparatus which is mounted on the sunshield visor on the interior of a vehicle enables the driver to see, without shifting his vision, the complete rearward and driver side field of vision. The apparatus is an elongated, preferably convex, mirror mounted in a frame and frictionally engaged by a clasp to the sunshield visor. The clasp is resiliently connected to the frame to reduce vibration. A bracket connected to the frame has a manually manipulatable screw therein which permits adjustment of the mirror as desired by a particular driver for improvement of the field of vision. In another embodiment, the frame has a plurality of clasps for engagement of the sunshield visor and a mirror of increased elongation. The apparatus has a resilient connection to reduce vibration and is manually adjustable for the particular driver. This embodiment improves the driver's field of vision rearwardly and to both sides of the vehicle.

9 Claims, 4 Drawing Sheets

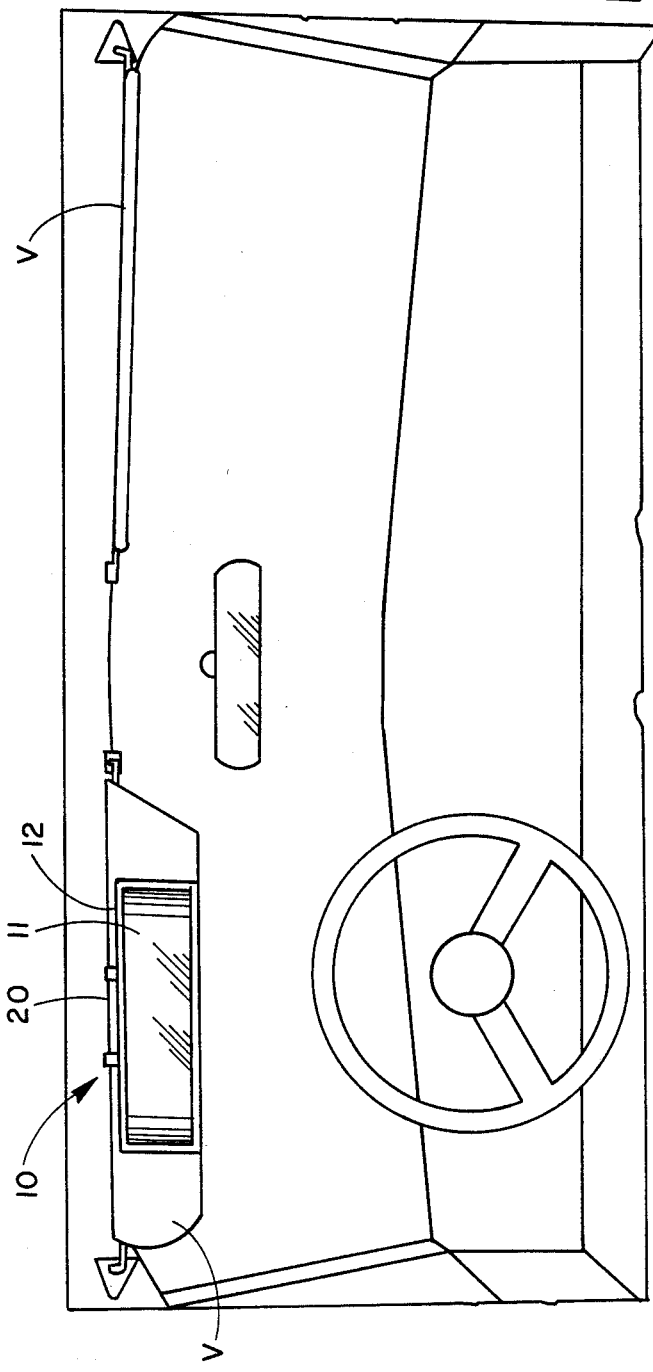
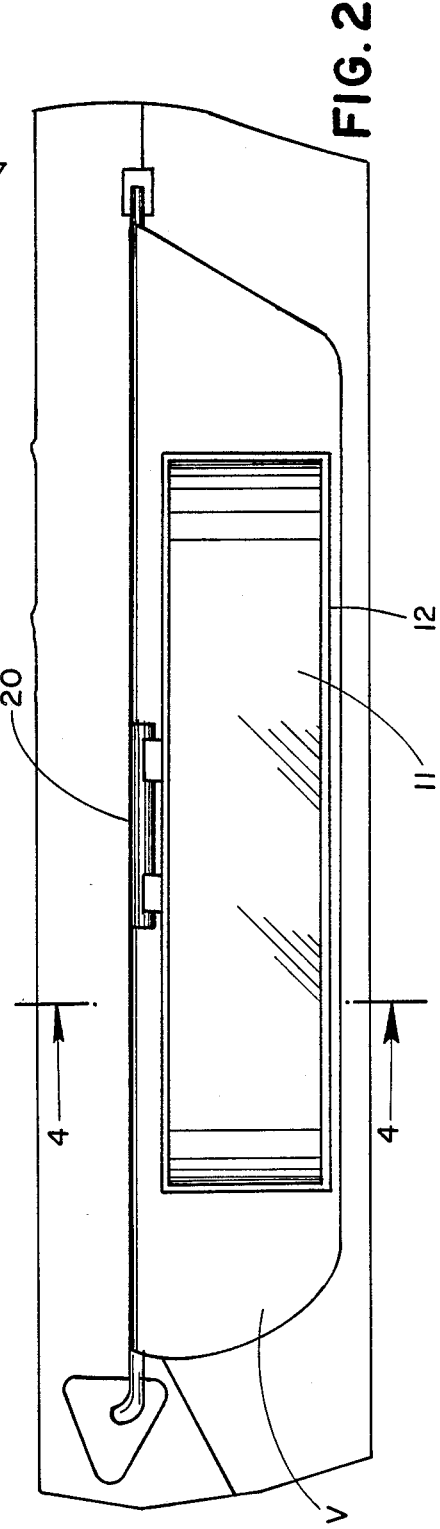

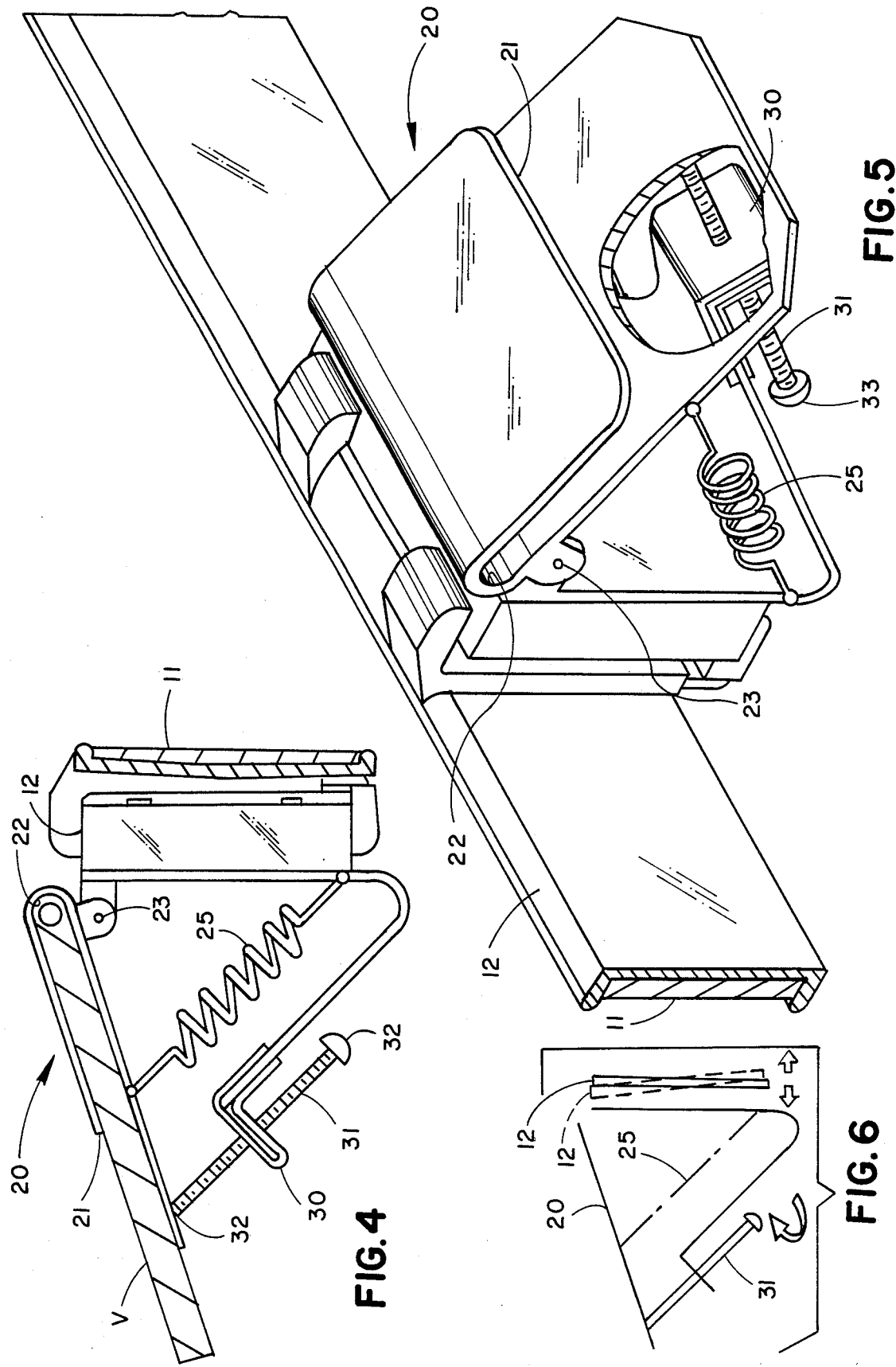

APPARATUS FOR IMPROVING A DRIVER'S REARWARD FIELD OF VISION IN A MOTOR VEHICLE

FIELD OF THE INVENTION

The present invention relates to an apparatus for improving the rearward field of vision of a driver of a motor vehicle, and, more particularly of an elongated, convex mirror adjustably mounted on the sunshield visor.

BACKGROUND OF THE INVENTION

One of the most serious concerns relating to driving a vehicle is the awareness of the driver of the presence of other vehicles at the rear and on the sides of his vehicle. This has been recognized by the inclusion of a rear view mirror and a side view mirror on most vehicles. However, these require the driver's vision to be shifted from upper right to lower left in order to locate other vehicles. Not only does this require distraction from forward vision for a relatively long period, but the quality of side vision is still comparatively poor. There are still "blind spots" on the driver's side of the vehicle.

One approach to alleviate this problem is the elongated, convex mirror which may be mounted over the standard rear view mirror. This device still does not provide adequate vision to remove the "blind spot" in the driver's side of the vehicle. U.S. Pat. No. 4,394,065 issued to Swanson discloses a mirror assembly to be mounted on the sunshield visor with a mirror on both sides of the visor. The device does not provide an instantaneous complete view of the entire field of vision needed for safe operation of a vehicle. The driver's vision must be shifted from upper right (the conventional rear view mirror) to upper center (the mirror disclosed). U.S. Pat. No. 4,187,001 issued to Redwitz et al discloses a view expanding apparatus mounted on the lower righthand portion of the windshield to provide an expanded field of view for observation by the driver. U.S. Pat. No. 3,679,255 issued to Nacarato teaches a transparent tinted filter attached to the sunshield visor.

While addressing the problem, none of these devices provide a simple device which presents the entire rear and side view, which the driver of the vehicle can see at a single glance and which adequately shows the rearward field of vision. There remains a need for an apparatus to improve the safety of operation of motor vehicles by providing better rearward vision to the driver of a motor vehicle.

SUMMARY OF THE INVENTION

Accordingly, it is a primary object of the present invention to improve the prior art by providing an apparatus which enables the driver of a motor vehicle to see, without shifting vision, the complete rearward and driver side field of vision.

It is a further object of the present invention to provide an apparatus which may be mounted on the sunshield visor of a vehicle which comprises a mirror and an adjustable mounting to improve the driver's rearward and sideward field of vision.

It is yet another object of the present invention to provide an apparatus to improve the driver's field of vision in which the effects of vibration are reduced.

It is still another object of the present invention to provide an apparatus with a plurality of adjustable mountings on the sunshield visor which simultaneously improves the driver's field of vision to the rear end to both sides of the vehicle.

In accordance with the teachings of the present invention, there is disclosed an apparatus mounted on an elongated edge of a pivoted, substantially horizontal sunshield visor disposed near the roof of the interior of a motor vehicle. The apparatus includes a mirror encompassed by a frame. A clasp is pivotally attached to the frame for mounting the frame and mirror by a frictional engagement on the sunshield visor. By this mounting, the mirror may be adjusted laterally on the elongated edge of the sunshield visor as desired by a particular driver. A resilient means connects the clasp to the frame to reduce vibration of the mirror. A manually manipulatable means is provided to adjustably pivot the frame along a horizontal axis about the pivotal attachment to the clasp as desired by a particular driver for improving the field of vision simultaneously to the rear and to the driver's side of the vehicle.

The frame encompassing the mirror has a top edge and a bottom edge. The clasp has a closed end and an open end. The closed end of the clasp is pivotally and obliquely connected to the top edge of the frame. The open end of the clasp extends outwardly therefrom such that the top edge of the sunshield visor may be frictionally engaged therein. The resilient means extends from the clasp to the bottom edge of the frame such that when the sunshield visor is engaged in the clasp, the resilient means urges the bottom edge of the frame toward the clasp, reducing vibration of the mirror when the vehicle vibrates. Preferably, the resilient means is a spring. The means for adjusting the frame comprises a bracket connected to the bottom edge of the frame. The bracket has a screw mounted therein and extending upwardly therefrom. The screw has an end engaging the clasp such that rotation of the screw in a first direction and in a second opposite direction moves the bottom edge of the frame along a horizontal axis toward and away, respectively, from the clasp. Rotation of the screw pivots the top of the frame about the connection with the clasp and permits the driver to adjust the mirror. Preferably, the screw has an opposite end extending downwardly from the bracket. The end of the screw has a means for manual adjustment thereon. Preferably, the mirror is an elongated convex mirror extending laterally across the windshield visor.

In an alternate embodiment, the apparatus is mounted on an elongated edge of a pivoted, substantially horizontal sunshield visor disposed near the roof of the interior of a motor vehicle. It includes an elongated convex mirror and a frame encompassing the mirror. The frame has a top edge, a bottom edge, a first end and a second end. The apparatus also has a plurality of spaced-apart clasps, each having a closed end and an open end. The closed end of each clasp is pivotally and obliquely connected to the top edge of the frame and toward the first end of the frame. The open end of each clasp extends outwardly therefrom such that the top edge of the sunshield visor may be frictionally engaged therein. In this manner, when the frame is mounted on the sunshield visor, the second end of the frame extends laterally from the sunshield visor away from the driver. The resilient means extends from each clasp to the bottom edge of the frame such that when the sunshield visor is engaged in the clasp, the resilient means urges the bottom edge of the frame toward the clasp. This reduces vibration of the mirror when the vehicle vibrates. The apparatus further includes a plurality of brackets corresponding to the clasps. Each bracket is connected to the bottom edge of the frame. Each bracket further has a screw mounted therein. Each screw has a first end and a second opposite end, the first end extends downwardly from the bracket and has a means for manual adjustment thereon. The second end of the screw extends upwardly from the bracket and engages the clasp. Rotation of the screw in a first direction moves the bottom edge of the frame along a horizontal axis towards the clasp and rotation of the screw in a second and opposite direction moves the bottom edge of the frame away from the clasp. The adjustment thereby pivots the top of the frame about the connection with the clasp permitting the driver to adjust the mirror for improving the field of vision simultaneously to the rear and to both sides of the vehicle.

These and other objects of the present invention will become apparent from a reading of the following specification, taken in conjunction with the enclosed drawings.

BRIEF DESCRIPTION OF THE DRAWINGS

FIG. 1 is a pictorial view of the interior of an automobile showing the apparatus of the present invention as viewed by the driver.

FIG. 2 is an enlarged segment of FIG. 1 showing the present invention mounted on the sunshield visor.

FIG. 4 is a cross-section view taken along the lines 4—4 of FIG. 1 showing the screw adjustment, clasp and resilient means.

FIG. 5 is a perspective view taken from the rear of the apparatus showing the clasp, bracket and a partial broken away portion of the clasp to illustrate the screw adjustment and a section view of the end of the frame and mirror.

FIG. 6 is a side elevation view showing alternate positions of the mirror as the screw is adjusted.

BRIEF DESCRIPTION OF THE PREFERRED EMBODIMENTS

Figure 3:
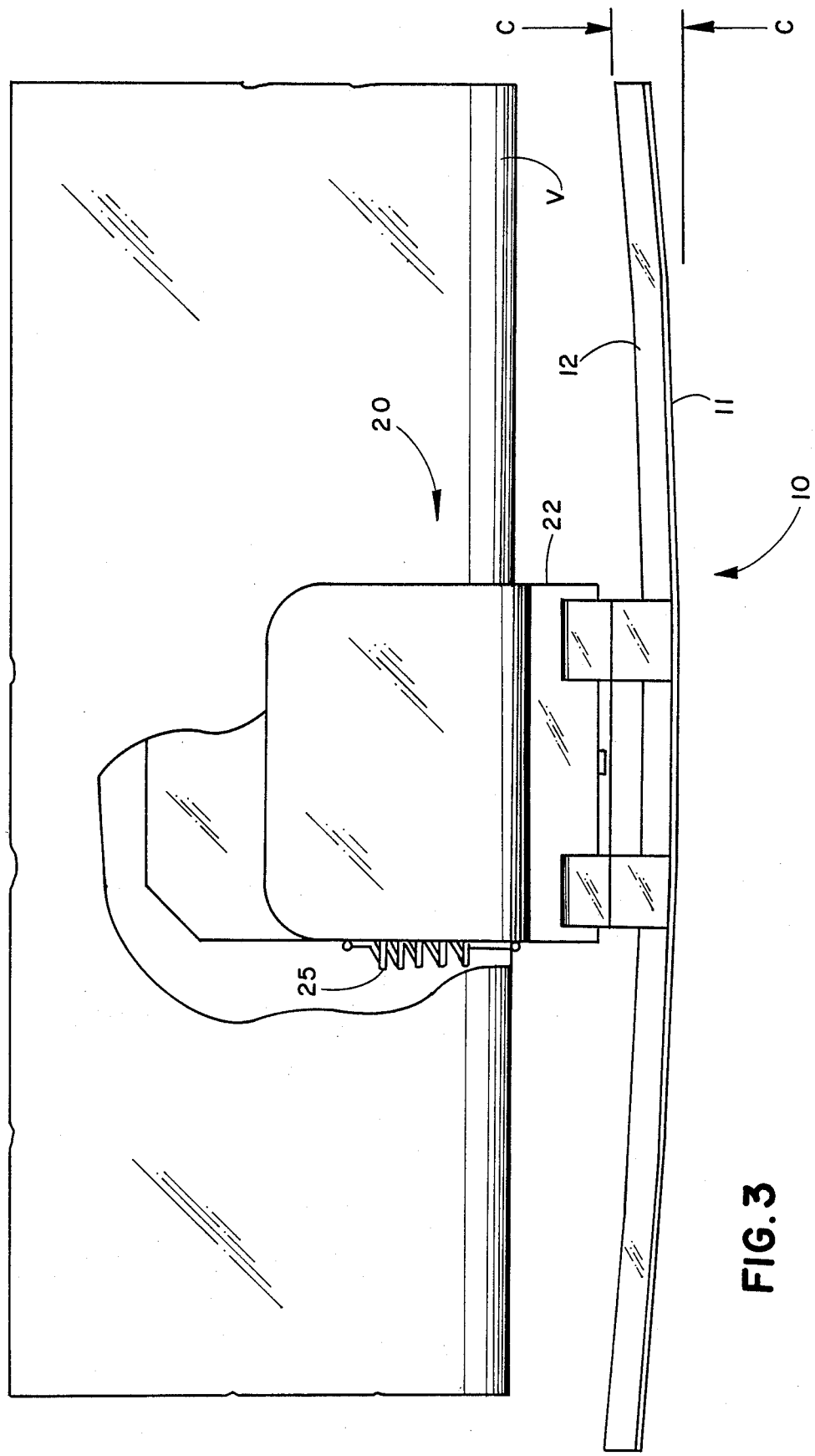
FIG. 3 is a top plan view of the apparatus showing the curvature of the mirror and the clasp for attachment to the sunshield visor with a portion of the visor broken away therefrom.

With reference to FIGS. 1 and 2, there is illustrated the interior of an automobile as viewed by the driver with the present invention 10 mounted on the pivoted horizontal sunshield visor V directly in front of the driver. The mirror 11, which preferably is convex, in the frame 12 is shown at the top of the visor with a clasp 20 for the visor connected to the top edge of the frame 12. The curvature of the mirror is shown by the lines C—C. The frame 12 is adjacent to the surface of the visor which faces the roof of the vehicle when the visor is in a stored position. To mount the apparatus 10 on the visor, the visor is rotated to its lowered position and the top edge of the visor is inserted in the open end of the clasp 21. FIG. 3 shows a top view of a part of the visor with the apparatus 10 mounted thereon. The mirror 11 in the frame 12 is pivotally connected to the closed end of the clasp 22. The partial broken away view of the visor shows the clasp 20 extending on both sides of the visor. Also shown is the spring 25 which connects the clasp 20 to the frame 12.

As shown in FIGS. 4–6, the closed end of the clasp 22 is shown to be pivotally mounted 23 to the top edge of the frame 12. The clasp 20 is obliquely connected to the visor so that the apparatus 10 will be in a plane for the driver to view easily when the visor is in a lowered position. The visor V is frictionally engaged in the open end of the clasp 21. A bracket 30 is connected to the bottom edge of the frame 12. An adjustment screw 31 is mounted in the bracket 30. A first end of the screw 32 extends upwardly from the bracket 30 and engages the clasp 20. The second opposite end of the screw 33 extends downwardly from the bracket 30 and may have a means thereon for manual adjustment, such as a knurled knob or a wing handle. As in FIG. 6, rotation of the screw 33 a first direction causes the bottom edge of the frame 12 to move toward the driver and rotation of the screw 33 in a second, opposite direction, causes the bottom edge of the frame 12 to move away from the driver along a horizontal axis. This adjustment permits the driver to adjust the position of the mirror 11 with respect to the driver's eye level for personal preference and improved vision.

Also shown in FIGS. 4 and 6 is the resilient means, which preferably is a spring 25, which connects the clasp 20 to the bottom edge of the frame 12. The resilient means urges the bottom edge of the frame 12 towards the clasp 20. This reduces vibration of the apparatus 10 which would otherwise occur due uneven road surface, etc.

Figure 7:
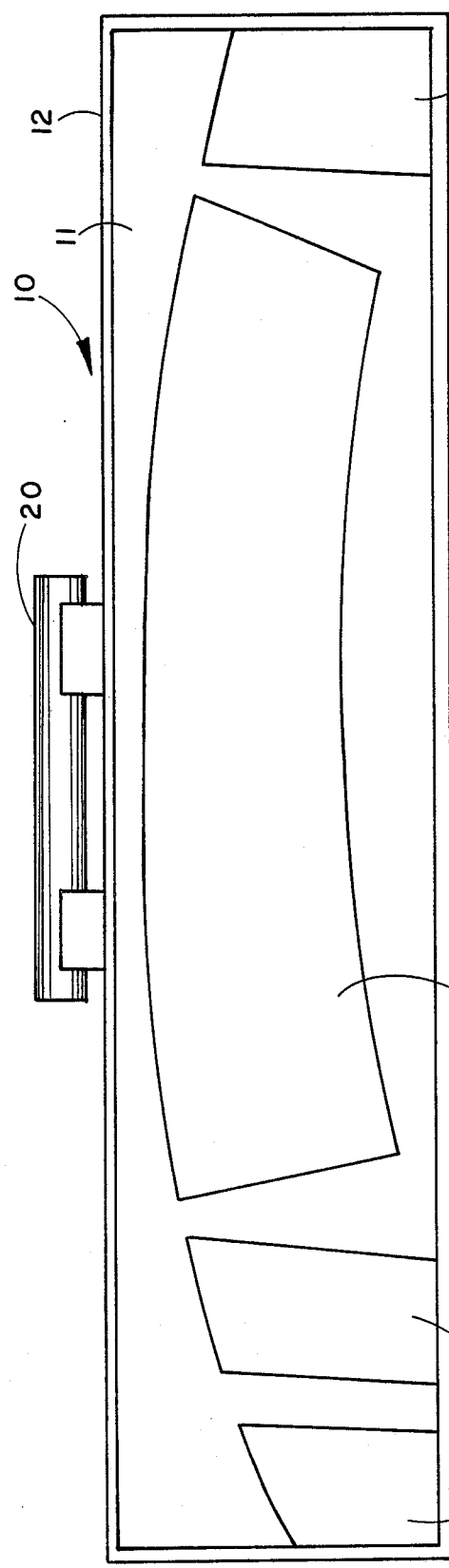
FIG. 7 is a pictorial view of the present apparatus showing the improved field of vision including both windows on the driver's side of the vehicle, the rear window and a portion of the rear side window on the passenger's side of the vehicle.
Figure 8:
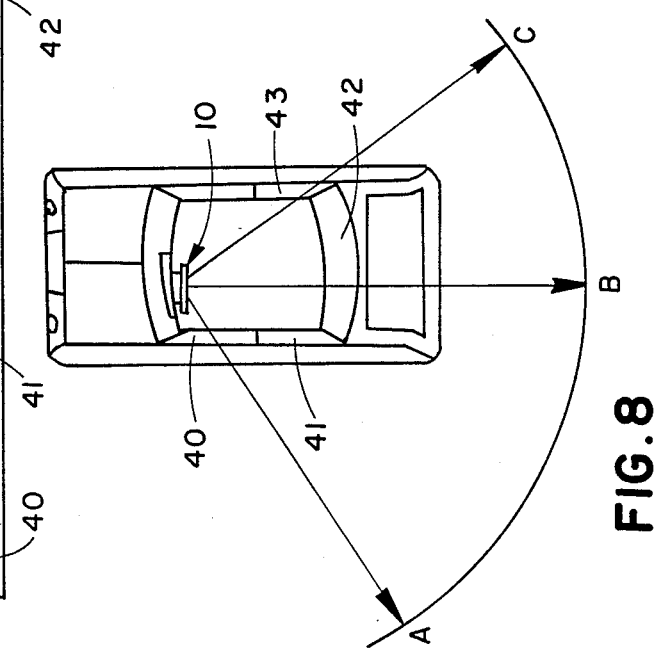
FIG. 8 is a diagrammatic view showing the improved field of vision of the driver using the apparatus.

The improved field of vision which the apparatus provides to the driver is diagrammatically seen in FIGS. 7 and 8. FIG. 7 shows the apparatus 10 with a representation of the windows through which the mirror images are obtained. The driver has an angular view through a portion of the window in the driver's door 40. Also, an angular view is received through the side rear window on the driver's side of the vehicle 41. These angular views eliminate the "blind spot" on the driver's side of the vehicle, The driver, with a single glance and without shifting vision, can see the direct image through the entire rear window 42 and can determine all vehicles in the rear of the vehicle being driven. In addition, the apparatus 10 provides an angular view through a portion of the side rear window on the passenger's side of the vehicle 43. The partial view through this window 43 locates either parked vehicles or, in multi-lane traffic, vehicles which might restrict lane changes to the right by the driver. FIG. 8 depicts that the arc AB is greater than the arc BC, showing the field of view available to the driver using the apparatus 10 of this invention.

Figure 9:
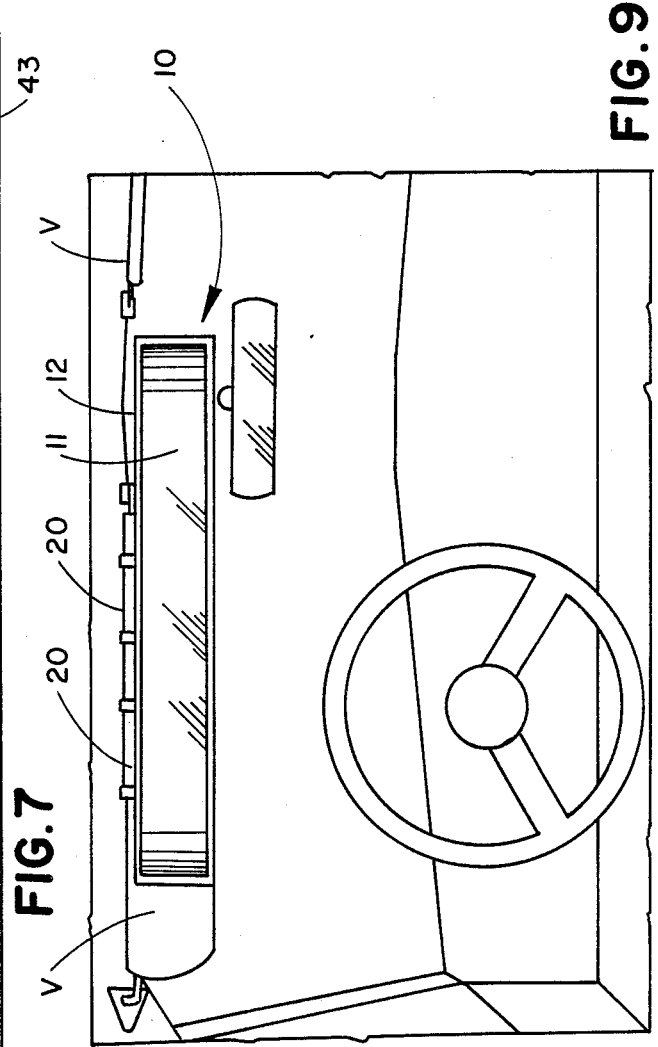
FIG. 9 is a pictorial view of the interior of an automobile showing an oversized apparatus in another embodiment of the present invention with two clasps to engage the sunshield visor.

In an alternate embodiment FIG. 9, the apparatus 10 has increased elongation over the one embodiment. It has a plurality of clasps 20 for mounting on the sunshield visor to accommodate the increased length. The clasps 20 are located toward the first end of the frame to mount on the visor. The second end of the frame extends laterally from the sunshield visor away from the driver. There are a plurality of brackets 30 and a plurality of adjusting screws 31 corresponding to the number of clasps 20. This embodiment provides the driver with an even more greatly improved field of vision. The driver may now view both sides of the vehicle as well as in the direct rearward direction.

In either embodiment, the driver sees the entire field with a single glance. There is no need for the driver's vision to be shifted neither upwardly nor downwardly nor from one mirror to another. Blind spots are eliminated and vehicle safety is significantly improved.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. An apparatus mounted on an elongated edge of a pivoted substantially horizontal sunshield visor disposed near the roof of the interior of a motor vehicle comprising:
    a mirror encompassed by a frame;
    a clasp pivotally attached to the frame for mounting the frame and mirror by a frictional engagement on the sunshield visor so that the mirror may be adjusted laterally on the elongated edge of the sunshield visor as desired by a particular driver;
    a resilient means connecting the clasp to the frame to reduce vibration of the mirror; and
    a manually manipulatable means to adjustably pivot the frame along a horizontal axis about the pivotal attachment to the clasp as desired by a particular driver for improving the field of vision simultaneously to the rear and to the driver's side of the vehicle.

2. The apparatus of claim 1, wherein the frame encompassing the mirror has a top edge and a bottom edge, the clasp has a closed end and an open end, the closed end of the clasp pivotally and obliquely connected to the top edge of the frame, the open end of the clasp extending outwardly therefrom such that the top edge of the sunshield visor may be frictionally engaged therein, the resilient means extending from the clasp to the bottom edge of the frame such that when the sunshield visor is engaged in the clasp, the resilient means urging the bottom edge of the frame toward the clasp, reducing vibration of the mirror when the vehicle vibrates.

3. The apparatus of claim 2, wherein the resilient means is a spring.

4. The apparatus of claim 2, wherein the means for adjusting the frame comprises a bracket connected to the bottom edge of the frame, the bracket having a screw mounted therein and extending upwardly therefrom, the screw having an end engaging the clasp such that rotation of the screw in a first direction and in a second opposite direction moves the bottom edge of the frame along a horizontal axis toward and away respectively, from the clasp thereby pivoting the top of the frame about the connection with the clasp and permitting the driver to adjust the mirror.

5. The apparatus of claim 4, wherein the screw has an opposite end extending downwardly from the bracket, the end of the screw having a means for manual adjustment thereon.

6. The apparatus of claim 1, wherein the mirror is a convex mirror.

7. The apparatus of claim 1, wherein the mirror is an elongated mirror extending laterally across the windshield visor.

8. An apparatus mounted on an elongated edge of a pivoted, substantially horizontal sunshield visor disposed near the roof of the interior of a motor vehicle comprising:
    an elongated convex mirror;
    a frame encompassing the mirror, the frame having a top edge and a bottom edge;
    a clasp having a closed end and an open end, the closed end of the clasp pivotally and obliquely connected to the top edge of the frame, the open end of the clasp extending outwardly therefrom such that the top edge of the sunshield visor may be frictionally engaged therein;
    a resilient means extending from the clasp to the bottom edge of the frame such that when the sunshield visor is engaged in the clasp, the resilient means urging the bottom edge of the frame toward the clasp, reducing vibration of the mirror when the vehicle vibrates; and
    a bracket connected to the bottom edge of the frame, the bracket having a screw mounted therein, the screw having a first end and a second opposite end, the first end extending downwardly from the bracket and having a means for manual adjustment thereon, the second end of the screw extending upwardly from the bracket and engaging the clasp such that rotation of the screw in a first direction moves the bottom edge of the frame along a horizontal axis towards the clasp and rotation of the screw in a second and opposite direction moves the bottom edge of the frame away from the clasp, thereby pivoting the top of the frame about the connection with the clasp permitting the driver to adjust the mirror for improving the field of vision simultaneously to the rear and to the driver's side of the vehicle.

9. An apparatus mounted on an elongated edge of a pivoted, substantially horizontal sunshield visor disposed near the roof of the interior of a motor vehicle comprising:
    an elongated convex mirror;
    a frame encompassing the mirror, the frame having a top edge, a bottom edge, a first end and a second end;
    a plurality of spaced-apart clasps, each having a closed end and an open end, the closed end of each clasp pivotally and obliquely connected to the top edge of the frame and toward the first end of the frame, the open end of each clasp extending outwardly therefrom such that the top edge of the sunshield visor may be frictionally engaged therein and such that when the frame is mounted on the sunshield visor, the second end of the frame extends laterally from the sunshield visor away from the driver;
    a resilient means extending from each clasp to the bottom edge of the frame such that when the sunshield visor is engaged in the clasp, the resilient means urging the bottom edge of the frame toward the clasp, reducing vibration of the mirror when the vehicle vibrates;
    a plurality of brackets corresponding to the clasps, each bracket connected to the bottom edge of the frame, each bracket further having a screw mounted therein, each screw having a first end and a second opposite end, the first end extending downwardly from the bracket and having a means for manual adjustment thereon, the second end of the screw extending upwardly from the bracket and engaging the clasp such that rotation of the screw in a first direction moves the bottom edge of the frame along a horizontal axis towards the clasp and rotation of the screw in a second and opposite direction moves the bottom edge of the frame away from the clasp, thereby pivoting the top of the frame about the connection with the clasp permitting the driver to adjust the mirror for improving the field of vision simultaneously to the rear and to both sides of the vehicle.

* * * * *